United States Patent
Yuan et al.

(10) Patent No.: US 11,717,903 B2
(45) Date of Patent: Aug. 8, 2023

(54) ELECTRICAL DISCHARGE MACHINING DEVICE AND METHOD

(71) Applicant: General Electric Company, Schenectady, NY (US)

(72) Inventors: Renwei Yuan, Shanghai (CN); Lei Li, Shanghai (CN); Yuanyuan Guo, Shanghai (CN); Peng Hu, Shanghai (CN); Nouman Usmani, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/580,819

(22) Filed: Jan. 21, 2022

(65) Prior Publication Data
US 2022/0143725 A1    May 12, 2022

Related U.S. Application Data

(63) Continuation of application No. 16/386,747, filed on Apr. 17, 2019, now Pat. No. 11,241,750.

(30) Foreign Application Priority Data

Apr. 19, 2018    (CN) .......................... 201810353668.2

(51) Int. Cl.
*B23H 7/26*    (2006.01)
*B23H 7/30*    (2006.01)

(52) U.S. Cl.
CPC .............. *B23H 7/265* (2013.01); *B23H 7/30* (2013.01); *B23H 2400/10* (2013.01); *B23H 2500/00* (2013.01)

(58) Field of Classification Search
CPC ................................................... B23Q 39/026
See application file for complete search history.

(56) References Cited

U.S. PATENT DOCUMENTS

| | | | |
|---|---|---|---|
| 2,273,228 A | 2/1942 | Hugo | |
| 2,369,828 A | 2/1945 | Humphreys | |
| 3,614,372 A * | 10/1971 | Dulebohn | ................ B23H 7/18 |
| | | | 219/69.15 |
| 3,981,786 A | 9/1976 | Andrews | |

(Continued)

FOREIGN PATENT DOCUMENTS

| | | |
|---|---|---|
| CN | 86102330 A | 10/1987 |
| CN | 2612494 Y | 4/2004 |

(Continued)

OTHER PUBLICATIONS

European Search Report Corresponding to Application No. 19169958 dated Sep. 2, 2019.

(Continued)

*Primary Examiner* — Geoffrey S Evans
(74) *Attorney, Agent, or Firm* — Fitch, Even, Tabin & Flannery LLP (57) ABSTRACT

The present disclosure relates to an electrical discharge machining (EDM) device, and a method for machining a workpiece by the EDM device. The EDM device includes a spindle, a guide structure including a plurality of guideways, and a plurality of electrodes, the electrode coupled to the spindle via a flexible link, and slidably engaged with a respective one of the plurality of guideways.

18 Claims, 6 Drawing Sheets

(56) References Cited

U.S. PATENT DOCUMENTS

| | | | |
|---|---|---|---|
| 4,670,635 | A | 6/1987 | Johnson |
| 4,739,145 | A | 4/1988 | Check |
| 5,028,755 | A | 7/1991 | Pertler |
| 6,373,018 | B1 | 4/2002 | Wei |
| 6,486,429 | B1 | 11/2002 | Wehrli |
| 8,395,069 | B2 | 3/2013 | Balemi |
| 9,849,528 | B2 | 12/2017 | Luo |
| 2009/0008529 | A1 | 1/2009 | Sugimoto |
| 2011/0186551 | A1 | 8/2011 | Itoh |
| 2017/0282267 | A1 | 10/2017 | Gao |
| 2017/0334008 | A1 | 11/2017 | Filipovic |
| 2019/0193178 | A1 | 6/2019 | Baker |
| 2019/0321902 | A1 | 10/2019 | Yuan |

FOREIGN PATENT DOCUMENTS

| | | | |
|---|---|---|---|
| CN | 206200274 | U | 5/2017 |
| JP | S5570528 | A | 5/1980 |
| WO | 2005097449 | A3 | 10/2005 |
| WO | 2018035800 | A1 | 3/2018 |

OTHER PUBLICATIONS

Machine Translated Chinese Office Action Corresponding to Application No. 201810353668 dated Mar. 27, 2020.

Chen et al., The characteristics of cutting pipe mechanism with multi-electrodes in EDM, Journal of Materials Processing Technology, vol. 203, Issue: 1-3, Jul. 18, 2008, pp. 461-464.

Weng et al., Study of the Batch Production of Micro Parts Using the EDM Process, The International Journal of Advanced Manufacturing Technology, vol. 19, Issue: 4, Feb. 2002, pp. 266-270.

\* cited by examiner

ELECTRICAL DISCHARGE MACHINING DEVICE AND METHOD

CROSS-REFERENCE TO RELATED APPLICATIONS

This application is a continuation of U.S. application Ser. No. 16/386,747, filed Apr. 17, 2019, which claims priority from Chinese Application No. 201810353668.2, filed Apr. 19, 2018, both of which are incorporated herein by reference in their entireties.

TECHNICAL FIELD

The present disclosure generally relates to electrical discharge machining, and more specifically to devices and methods for performing electrical discharge machining in components such as annular components.

BACKGROUND

Electrical discharge machining (EDM) is a manufacturing process whereby shapes are formed in a subject material using electrical discharge (sparks). An electrode (also called a tool electrode) is placed proximate the subject material (also called a workpiece), and an electrical voltage is applied between the electrode and workpiece. As a distance between the electrode and the workpiece decreases, the intensity of the electricity between the electrode and the workpiece increases to a certain value, the dielectric medium breaks down to form a plasma heat field with high temperature, which melts and vaporizes materials from both electrode and workpiece. The electrode material removal causes electrode loss, whereas the workpiece material removal forms the desired shape.

Currently, EDM is mainly used for machining molds and aeronautical parts or components made of difficult-to-machine materials, and EDM is the most reliable technology used in mechanical manufacturing industry. However, ram or sink EDM is relatively slow, and it is required a long machining time when trying to form a complex mold, such as a part with a large number of complicated geometrical features such as holes or cavities in different locations. Because the complex geometrical features in different directions are typically machined one by one by moving an electrode in one direction while rotating the workpiece with multi-axes that may result in low efficiency and complex motion of the workpiece. In some cases, several EDM machines may be employed at one time in order to meet production time requirements, which occupies a significant amount of floor space in a manufacturing facility.

It is desirable to provide a solution to address at least one of the above-mentioned problems.

BRIEF DESCRIPTION OF THE INVENTION

A first aspect of the present disclosure includes an EDM device comprising a spindle, a guide structure comprising a plurality of guideways, and a plurality of electrodes, the electrode coupled to the spindle via a flexible link, and slidably engaged with a respective one of the plurality of guideways.

A second aspect of the present disclosure includes an EDM device comprising a carriage configured to be assembled to a rotatable and/or axially movable spindle, a guide structure comprising a plurality of guideways, and a plurality of electrode holders coupled to the carriage via a plurality of flexible links, respectively, and slidable along the plurality of guideways, respectively. The electrode holder is configured to hold an electrode. The flexible links and the guideways are configured to allow the electrodes to be fed to a workpiece to be machined, respectively along different directions angled with respect to a moving direction of the carriage.

A third aspect of the present disclosure includes a method for machining a workpiece by an electrical discharge machining device that comprises a spindle defining an axis, a guide structure comprising a plurality of guideways, and a plurality of electrodes coupled to the spindle via a plurality of flexible links respectively and slidably engaged with the plurality of guideways respectively. The method comprises: installing the workpiece to a supporting element; fixing the guide structure relative to the supporting element; and feeding the plurality of electrodes to the workpiece to create desired geometry, respectively along directions angled with respect to a moving direction of the spindle.

BRIEF DESCRIPTION OF THE DRAWINGS

The above and other aspects, features, and advantages of the present disclosure will become more apparent in light of the subsequent detailed description when taken in conjunction with the accompanying drawings in which.

It is noted that the drawings of the present disclosure are not necessarily to scale. The drawings are intended to depict only typical aspects of the invention, and therefore should not be considered as limiting the scope of the invention. In the drawings, like numbering represents like elements between the drawings.

DETAILED DESCRIPTION

One or more embodiments of the present disclosure will be described below. Unless defined otherwise, technical and scientific terms used herein have the same meaning as is commonly understood by one of skill in the art to which this invention belongs. The terms "first", "second", "third", "fourth" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any, some, or all of the listed items. The use of "including," "comprising" or "having" and variations thereof herein are meant to encompass the items listed thereafter and equivalents thereof as well as additional items. The term "coupled" or "connected"

or the like includes but is not limited to being connected physically or mechanically, and may be connected directly or indirectly.

Embodiments of the present disclosure relate to an electrical discharge machining (EDM) device including a spindle, and multiple electrodes coupled to the spindle via flexible links and swingable with respect to the spindle. The electrodes can be driven by the spindle to move forward to machine a workpiece along directions different from a moving direction of the spindle. The device is capable of creating complicated geometry in the workpiece along different directions, for example, creating multiple inclined holes or cavities in a lateral wall of an annular part (workpiece), at high machining speed, which can dramatically reduce machining time.

Figure 1:
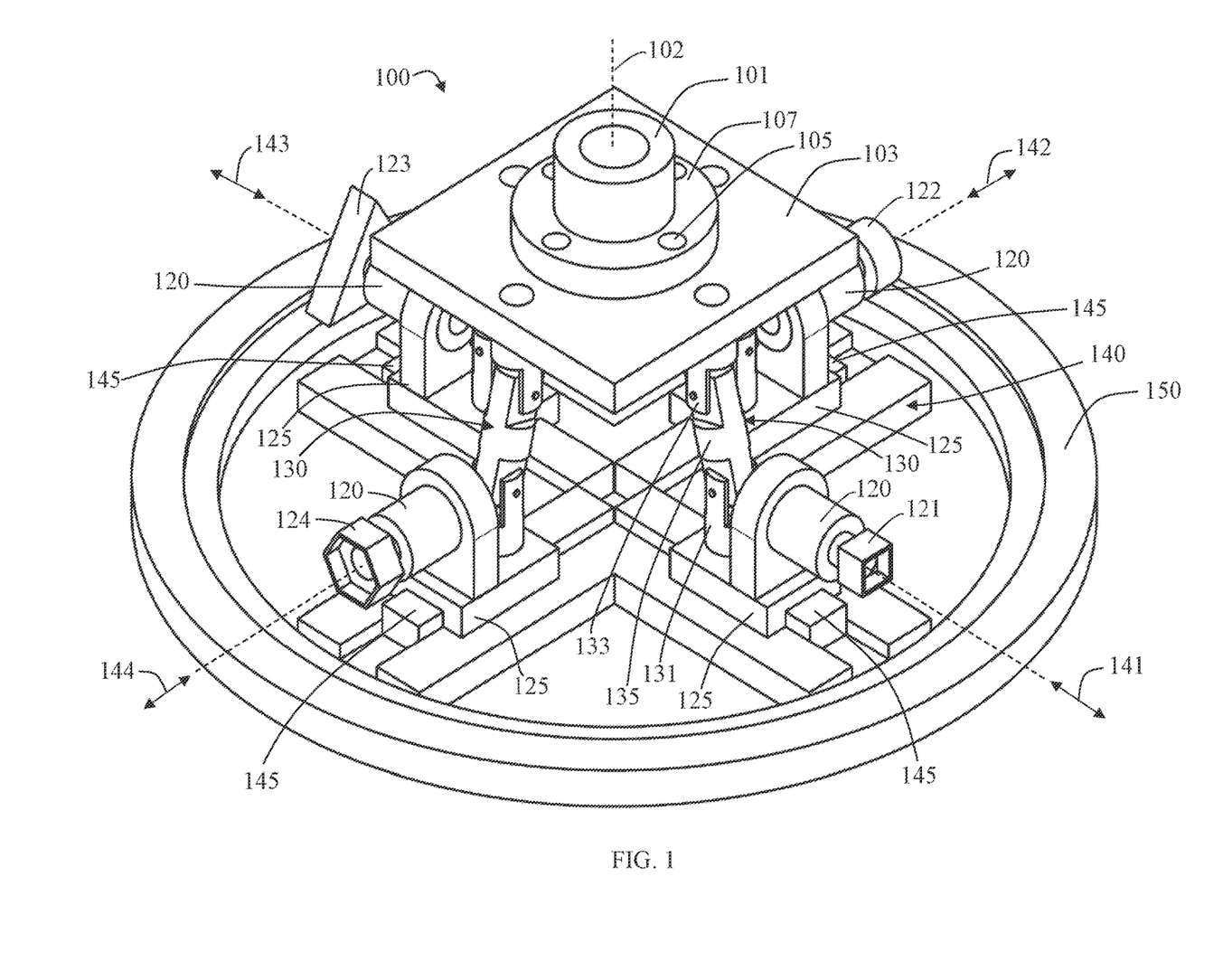
FIG. 1 shows a schematic depiction of an electrical discharge machining (EDM) device according to a first exemplary embodiment.
Figure 2:
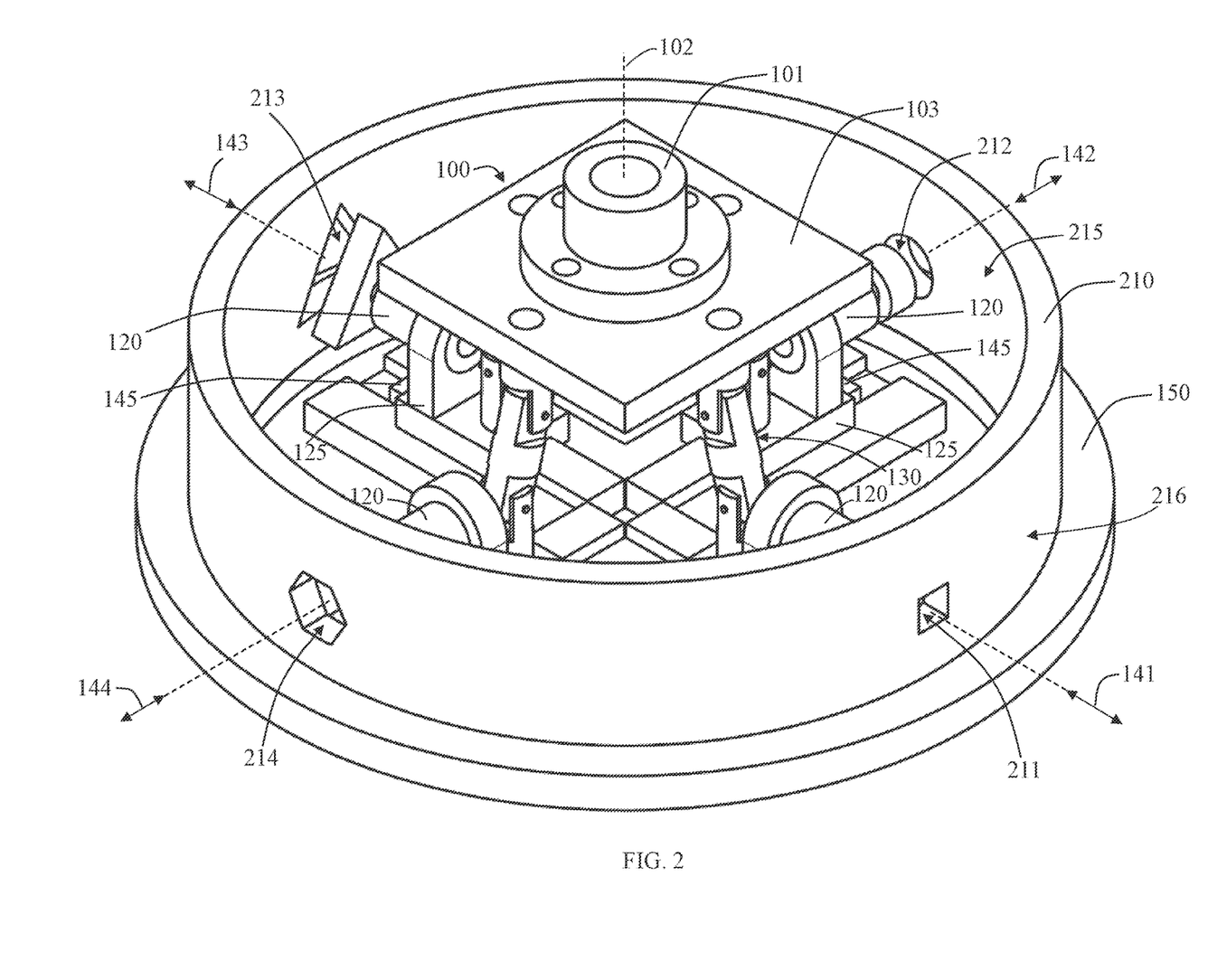
FIG. 2 shows a situation when the EDM device of FIG. 1 is used to machine a workpiece.

FIG. 1 is a schematic perspective view of an EDM device 100 in accordance with a first exemplary embodiment. FIG. 2 shows a situation when the EDM device 100 is used to machine a workpiece 210. The workpiece 210 may be made of any electrically conductive materials that may be machined by electric discharging or wire electric discharging. In the embodiment, the workpiece 210 may be an annular part with a circle of holes through a lateral wall thereof, wherein the holes are different in shape and/or size, for example, a square hole 211, a circular hole 212, a triangle hole 213 and a hexagonal hole 214.

Referring to FIGS. 1 and 2, the device 100 includes a spindle 101, and a plurality of electrodes 120 coupled to the spindle 101. The number and configuration of the electrodes 120 may vary, depending on the structure of the workpiece to be machined. For example, in the embodiment as illustrated, there are four electrodes 120 with different tips 121, 122, 123 and 124, corresponding to the holes 211, 212, 213 and 214, respectively. The four electrodes 120 are coupled to a carriage 103, which is assembled to the spindle 101 through fastening elements, such as bolts 105 and a washer 107. Each of the electrode 120 is coupled to the carriage 103 via a flexible link 130 and therefore is swingable with respect to the carriage 103 as well as the spindle 101. The flexible link 130 may be any kind of connecting elements configured to connect a second member to a first member and allow the second member to swing with respect to the first member, and more specifically, connecting elements that enable the electrode 120 to be swingable with respect to the carriage 103 and/or spindle 101. Examples of suitable flexible links include but are not limited to universal joints, flexible pipes or flexible cables. In the embodiment as illustrated, the flexible link 130 is a double cardan universal joint including two universal joints 131 and 133 mounted back to back with a center yoke 135, wherein the universal joint 131 is coupled to the electrode 130 and the universal joint 133 is coupled to the carriage 103.

The spindle 101 serves as a feed shaft, which can be driven by a driver such as a motor (not shown), to move along a longitudinal axis thereof and/or to rotate around the longitudinal axis thereof, so as to feed the electrodes 120 to the workpiece 210 to create desired geometry in/on the workpiece 210. In the embodiment as illustrated, the electrodes 120 are fed by feeding the spindle 101 along its longitudinal axis 102. The carriage 103 may be in different shapes. Examples of suitable carriages include but are not limited to circular carriages and square carriages. The carriage 103 may have an increased horizontal size compared to the spindle 101, in a plane substantially perpendicular to the longitudinal axis 102 of the spindle 101. The flexible links 130 may be coupled to the carriage 103 at positions near an outer boundary/periphery of the carriage 103.

The device 100 further includes a guide structure 140 for guiding movements of the electrodes 120 during the EDM process. The guide structure 140 may be made of any electrically non-conductive materials. The guide structure 140 includes a plurality of guideways 145, and each of the electrodes 120 is provided with a slider 125 for sliding along one of these guideways 145. In some embodiments, the electrode 120 is installed on the respective slider 125 that serves as an electrode holder as well, and is coupled to the respective flexible link 130 via the respective slider 125. By reciprocating the sliders 125 along the guideways 145, the electrodes 120 move forward (towards the workpiece) to machine the workpiece 210 and backward (away from the workpiece) to withdraw from the workpiece 210. The moving direction of the electrode 120 may be determined based on an extending direction of its respective guideway 145 and an installation angle of that electrode 120 with respect to its respective slider 125. The moving direction of the electrode 120 may be parallel to the extending direction of the respective guideway 145, or at a fixed angle to the extending direction of the respective guideway 145, depending on the installation angle of that electrode 120 with respect to the respective slider 125. In some embodiments, the moving direction of the electrode 120 is parallel to the extending direction of the respective guideway 145 if the installation angle is zero, and the moving direction of the electrode 120 is at a fixed angle to the extending direction of the respective guideway 145 and the fixed angle is equal to the installation angle if the installation angle is not zero.

The extending directions of the guideways 145 may be determined by the geometry to be created in/on the workpiece. In some embodiments, for creating geometry such as holes or cavities in different directions, the guideways may extend along directions the same as the geometry to be formed. For example, as illustrated in FIG. 2, there are four guideways 145 extending along directions the same as the holes 211, 212, 213 and 214 extend, respectively.

The extending directions 141, 142, 143 and 144 of the four guideways 145 are different from (angled with respect to) the moving direction of the spindle 101, i.e., the moving direction of the carriage 103. Thus, the electrodes 120 are driven by the spindle 101 to move forward to machine the workpiece 210 along directions different from the moving direction of the spindle 101. In the embodiment, the extending directions 141, 142, 143 and 144 of the guideways 145 are substantially perpendicular to the moving direction of the spindle 101. More specifically, the four guideways 145 extend along four radial directions of the spindle 101 (also radial directions of the workpiece 210), respectively. That is to say, the guideway extending directions 141, 142, 143 and 144 coincide with four radial directions of the spindle 101 or workpiece 210, respectively.

In the embodiment, each electrode 120 is installed substantially parallel to the sliding direction of its respective slider 125, i.e., the extending direction of its respective guideway 145, and the installation angle of the electrode 120 with respect to its respective slider 125 is deemed as zero. As the slider 125 slides along the guideway 145, the electrode 120 installed on this slider 125 move along a direction parallel to the extending direction of the guideway 145. As used herein, the electrode installed substantially parallel to a certain direction means having a feeding direction of the electrode substantially parallel to the certain direction.

In other embodiments, at least one of the electrodes 120 may be installed at an installation angle to a sliding direction of its respective slider 125, and thus may move along a direction at that installation angle to the sliding direction. During the machining process, the spindle 101 moves up and down along an axial direction thereof to drive the electrodes 120 to move along or parallel to the extending directions of the guideways 145 respectively, to machine the workpiece 210. The moving direction of the electrode 120 can be adjusted by changing the extending direction of the respective guideway 145.

The device 100 may further include a supporting element 150 for supporting the workpiece 210. The supporting element 150 may be made of electrically non-conductive materials to make sure the isolation between workpiece 210 and electrodes 120 as well as guide structure 140 before machining. During the machining process, the guide structure 140 is fixed relative to the supporting element 150. Specifically, the guide structure 140 may be detachably fixed to the supporting element 150, or detachably fixed to a common platform together with the supporting element 150. In the embodiment, the electrodes 120 are configured to be placed adjacent to an inner face 215 of the workpiece 210 during the machining process, such that the machining is from the inner face 215 of the workpiece 210 towards an outer face 216 of the workpiece 210.

Figure 3:
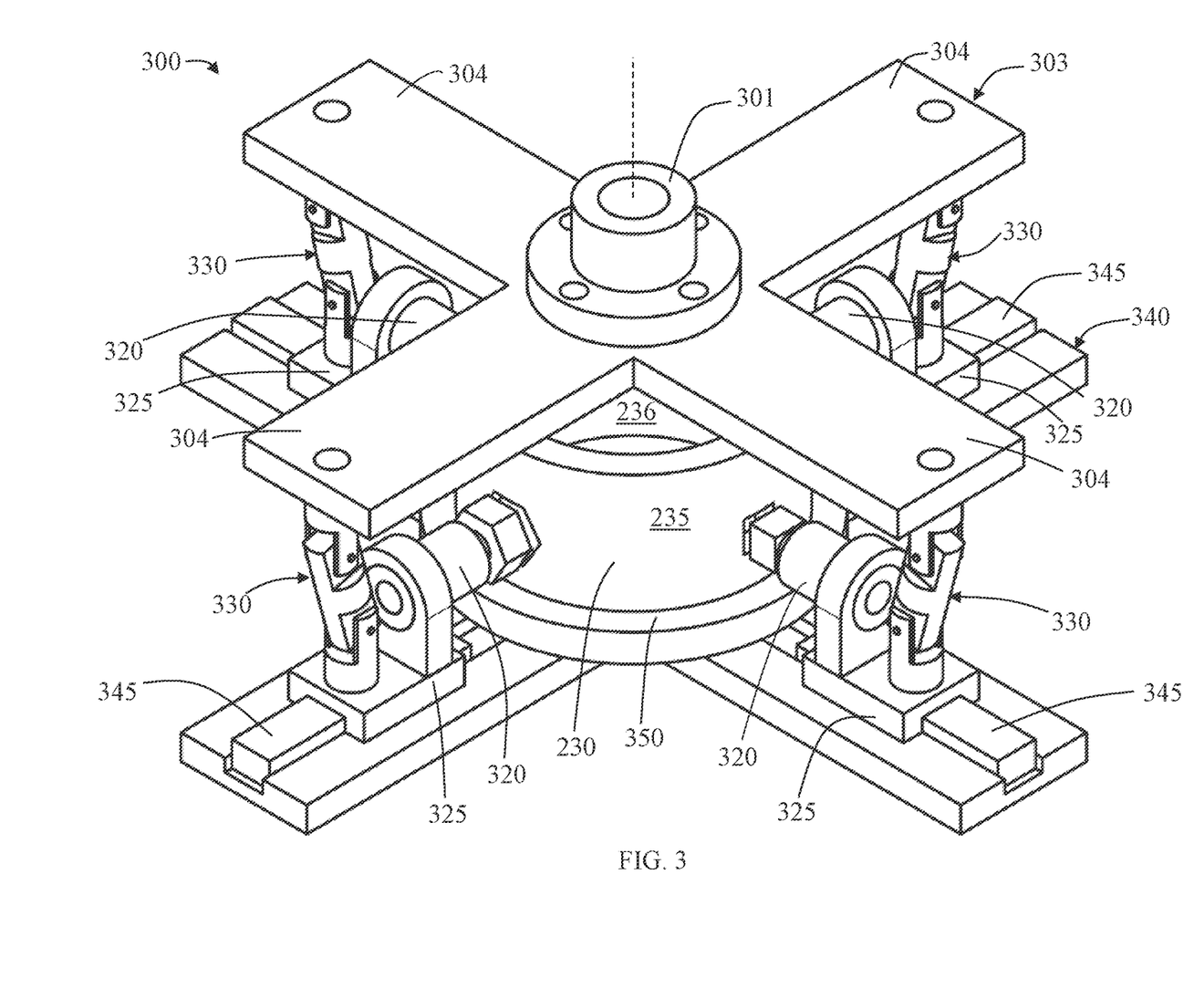
FIG. 3 shows a schematic depiction of an EDM device and a workpiece according to a second exemplary embodiment.

FIG. 3 is a schematic perspective view of an EDM device 300 and an annular workpiece 230 in accordance with a second exemplary embodiment. The EDM device 300 is similar to the EDM device 100 as shown in FIGS. 1 and 2. A main difference from the EDM device 100 is that, in the EDM device 300, the machining is along directions from an outer face 235 of the workpiece 230 towards an inner face 236 of the workpiece 230.

The device 300 includes a spindle 301, a carriage 303 assembled with the spindle 301, a guide structure 340 including a plurality of guideways 345, and a plurality of electrodes 320, each of which is coupled to the carriage 303 via a flexible link 330 and slidably engaged with one of the plurality of guideways 345. The carriage 303 has a plurality of mounting arms corresponding to the plurality of guideways 345, respectively. For example, as illustrated, the carriage 303 is in a shape of cross and has four mounting arms 304 extending parallel to the four guideways 345, respectively. Each of the flexible links 330 is coupled to one of the mounting arms 304 at a bottom position near a free end of that mounting arm 304. Each electrode 320 is installed on a slider 325 for sliding along one of the guideways 345, and the slider 325 is coupled to one of the flexible links 330. During the machining process, the spindle 301 moves up and down along an axial direction thereof to drive the sliders 325 to slide along the guideways 345 respectively, and thus the electrodes 320 installed on these sliders 325 move along or parallel to the extending directions of the guideways 345 respectively, to machine the workpiece 230.

The electrodes 320 of the device 300 are placed adjacent to an outer face 235 of the workpiece 230 during the machining process, such that the machining is from the outer face 235 of the workpiece 230 towards an inner face 236 of the workpiece 230. As such, the device 300 is not only capable of creating holes or cavities through a sidewall of the workpiece 230, but also capable of creating geometry available only from the outer face of the workpiece 230, for example, recesses on the outer face 235 but not opened onto the inner face 236.

As illustrated in FIG. 3, a supporting element 350 for supporting the workpiece 230 is located at a radial center of the device 300. The electrodes 320 are and located around the annular workpiece 230 fixed on the supporting element 350 and spaced along a circumferential direction of the annular workpiece 230. During the machining process, the electrodes 320 can be driven to machine the workpiece 230 from the outer face 235 towards the inner face 236.

In this embodiment, as well as the following third and fourth embodiments that will be discussed hereinafter, for concision, elements the same as or similar to these in the EDM device 100 may not be repeatedly described in details.

Figure 4:
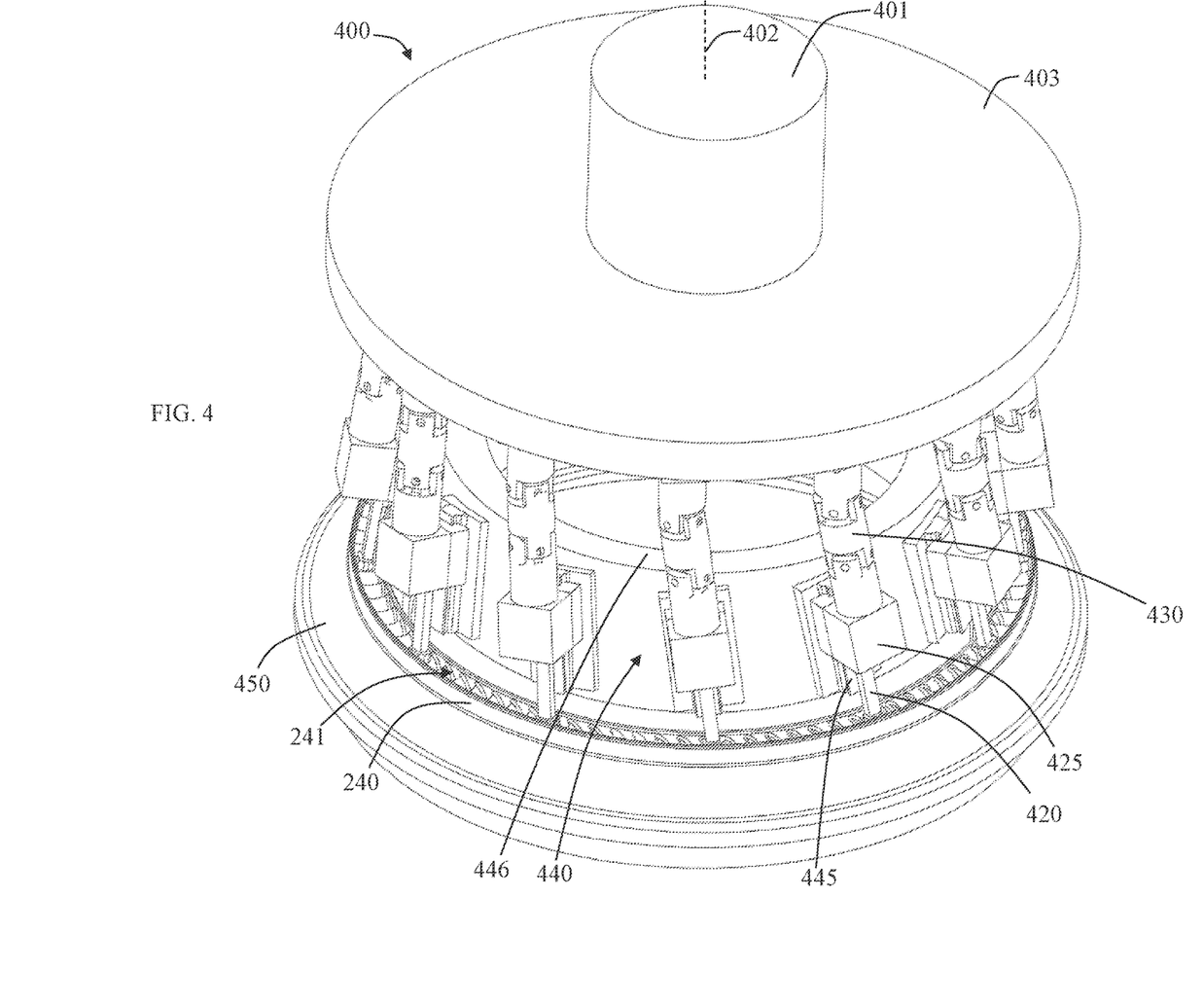
FIG. 4 shows a schematic depiction of an EDM device and a workpiece according to a third exemplary embodiment.

FIG. 4 is a schematic perspective view of an EDM device 400 and a workpiece 240 in accordance with a third exemplary embodiment. In this embodiment, the workpiece 240 to be machined is an annular part with multiple inclined cavities 241, and the EDM device 400 is configured to machine such a part with inclined cavities at a high machining speed.

The device 400 includes a spindle 401 having a longitudinal axis 402, a carriage 403 assembled with the spindle 401, a guide structure 440 including a plurality of guideways 445, and a plurality of electrodes 420, each of which is coupled to the carriage 403 via a flexible link 430 and slidably engaged with one of the plurality of guideways 445. The carriage 403 is a circular plate concentric and/or coaxial with the spindle 401. The flexible links 430 are coupled to the carriage 403 at positions near an outer boundary/periphery of the carriage 403. Each electrode 420 is installed on a slider 425 for sliding along a respective one of the guideways 445, and the slider 425 is coupled to a respective one of the flexible links 430.

In the device 400, the guideway extending directions and the electrode moving directions are at acute angles with respect to the axis 402 of the spindle 401, rather than parallel or perpendicular to the axis 402 of the spindle 401. As such, the device 400 is capable of providing geometry created in an inclined direction, for example, inclined holes or cavities 241 created in an inclined direction at acute angles with respect to a moving/feeding direction of the spindle 401, i.e., an axial direction of the spindle 401. In the embodiment, the moving directions of different electrodes 420 are at substantially equal angles to the axis 402 of the spindle 401. In other embodiments, the moving directions of different electrodes 420 may be at different angles to the axis 402 of the spindle 401.

As illustrated in FIG. 4, the guide structure 440 includes an annular body 446, and the plurality of guideways 445 are formed on a conical outer face of the annular body 446. In other embodiments, the guideways 445 may be formed on a conical inner face of the annular body 446. As the spindle 401 moves along an axial direction thereof, the electrodes 420 are driven to creating a batch of inclined cavities. Then the spindle 401 may rotate around the axis 402 thereof to change the positions of the electrodes 420 such that another batch of inclined cavities can be created by again driving the spindle 401 to move along the axial direction thereof. As such, a large number of inclined cavities more than the electrodes can be provided. For example, the device 400 may have eleven electrodes 420 and can be used to provide more than eleven inclined cavities 241 on the workpiece 240.

Figure 5:
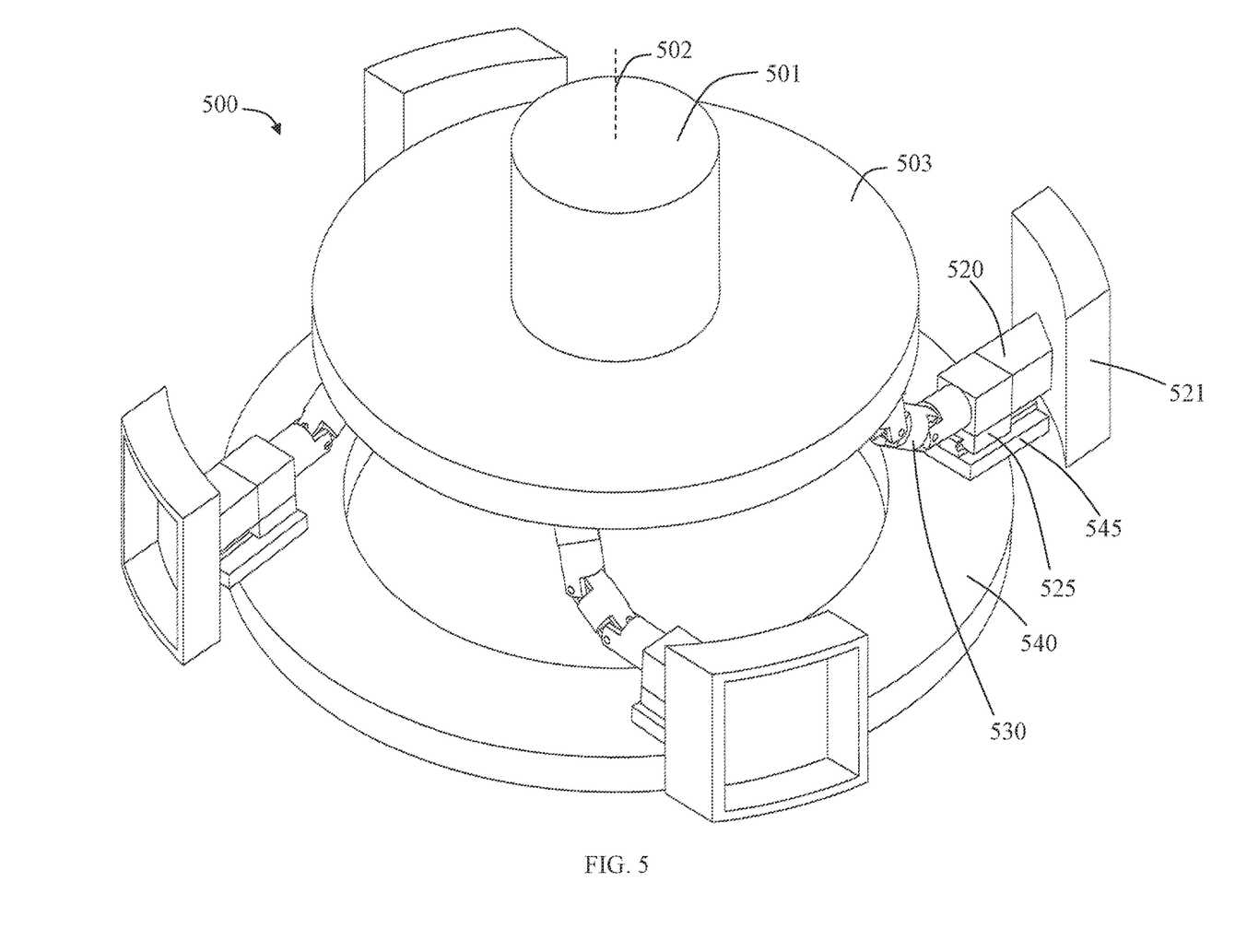
FIG. 5 shows a schematic depiction of an EDM device according to a fourth exemplary embodiment.
Figure 6:
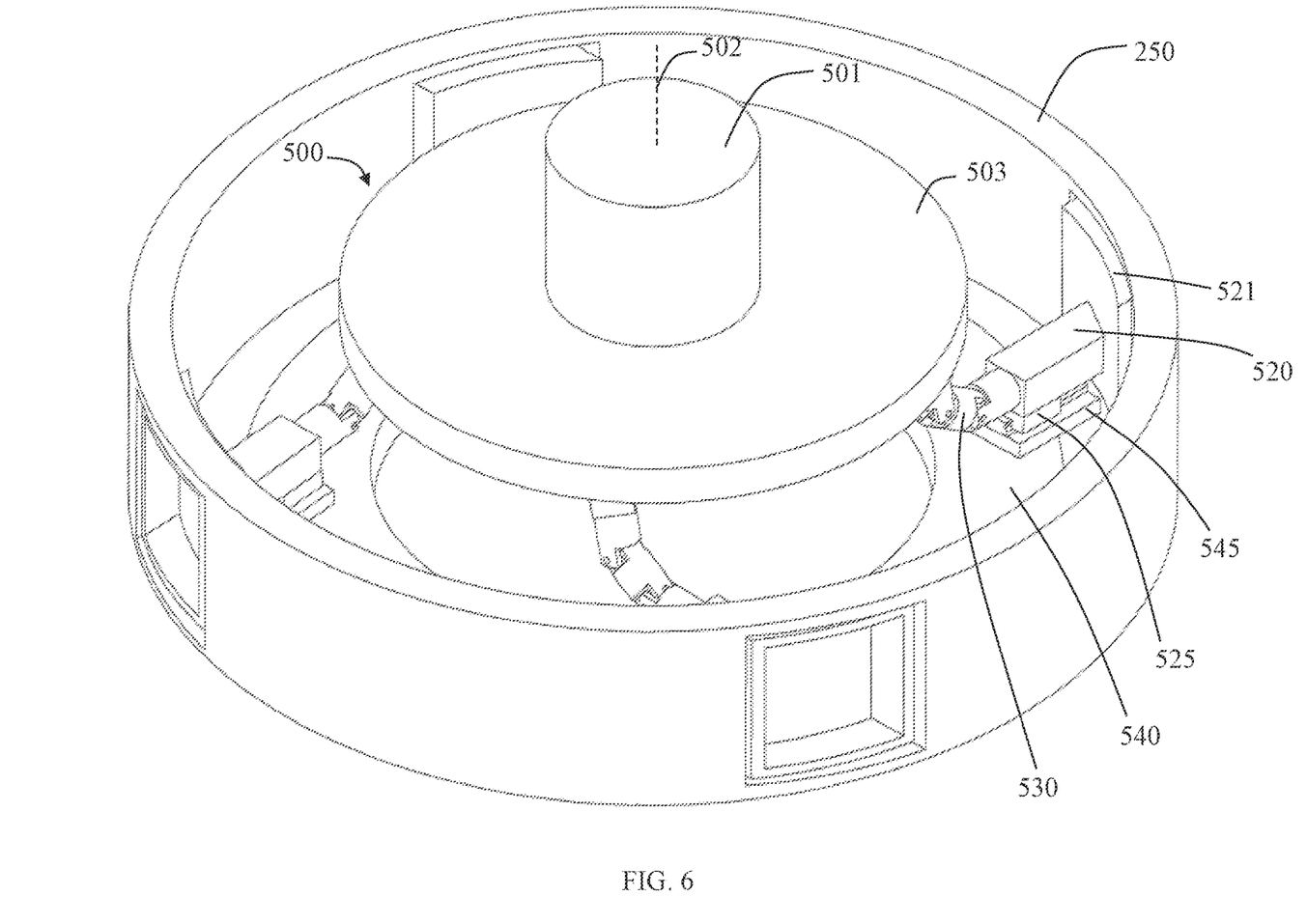
FIG. 6 shows a situation when the EDM device of FIG. 5 is used to machine a workpiece.

FIG. 5 is a schematic perspective view of an EDM device 500 in accordance with a fourth exemplary embodiment. FIG. 6 shows a situation when the EDM device 500 is used to machine a workpiece 250.

The EDM device 500 includes a spindle 501 having an axis 502, a carriage 503 assembled with the spindle 501, a guide structure 540 including a plurality of guideways 545, and a plurality of electrodes 520, each of which is installed on a slider 525 for sliding along one of the guideways 545, which slider 525 is coupled to the carriage 503 via a flexible link 530.

The guideways 545 are not coplanar with the axis 502 of the spindle 501 (neither parallel to nor intersecting the axis 502), which makes the sliders 525 can be driven to slide along the guideways 545, respectively, by rotating the spindle 501 around the axis 502 thereof. During the machining process, after positioning the device 500 relative to the workpiece 250, the spindle 501 may no longer need to move along the axial direction thereof to feed the electrodes 520, and instead, it is rotated around the axis 502 to feed the electrodes 520 to machine the workpiece 250. The geometry created by each electrode 520 may extend along a direction coincide with or parallel to the extending direction of the respective guideway 545, which is not coplanar with the axis 502 of the spindle 501. The device 500 is capable of providing geometry created in particular directions.

Embodiments of the present disclosure also relate to a method for machining a workpiece by an EDM device, such as an EDM device including a spindle defining an axis, a guide structure including a plurality of guideways, and a plurality of electrodes coupled to the spindle via a plurality of flexible links respectively and slidably engaged with the plurality of guideways respectively, as described above. In the method, the workpiece is installed to a supporting element, the guide structure is fixed relative to the supporting element, and the electrodes are fed to the workpiece to create desired geometry along directions angled with respect to the axis of the spindle, respectively, by driving the spindle to move along and/or rotate around the axis thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical discharge machining (EDM) device, comprising:
   a spindle assembly that is rotatable about a longitudinal axis;
   a guide structure comprising a plurality of guideways;
   wherein the spindle assembly comprises a spindle and a carriage and the carriage is arranged in parallel relation to the plurality of guideways; and
   a plurality of electrodes, each of the electrodes coupled to the carriage via a flexible link, and slidably engaged with a respective one of the plurality of guideways;
   wherein each of the electrodes is installed on a slider configured to slide along the respective one of the plurality of guideways, each slider being coupled to a corresponding flexible link, each of the plurality of guideways extending radially in an extending direction outward from the longitudinal axis;
   wherein the plurality of electrodes are placed adjacent to an outer face of a workpiece and the machining is from the outer face towards an inner face.

2. The EDM device of claim 1, wherein each of the plurality of guideways extend along a direction generally perpendicular with respect to the longitudinal axis.

3. The EDM device of claim 1, wherein the guide structure is fixed relative to a supporting element configured to support the workpiece.

4. The EDM device of claim 1, wherein the flexible link and each of the plurality of guideways are configured to allow the plurality of electrodes, driven by the spindle assembly, to be fed to the workpiece, respectively along directions perpendicular with respect to a moving direction of the spindle assembly.

5. The EDM device of claim 1, wherein the carriage is assembled with the spindle, and wherein the carriage has an increased horizontal size compared to the spindle, in a plane substantially perpendicular to the longitudinal axis of the spindle.

6. The EDM device of claim 5, wherein the flexible link is configured to couple the plurality of electrodes to the carriage at a position near an outer boundary of the carriage.

7. The EDM device of claim 1, wherein the plurality of electrodes are configured to create one or more holes extending through a wall of the workpiece.

8. The EDM device of claim 1, wherein the plurality of electrodes are configured to create holes through a wall in the workpiece.

9. The EDM device of claim 1, wherein the plurality of electrodes are configured to create recesses in a wall of the workpiece.

10. A method for machining a workpiece by an electrical discharge machining device that comprises a rotating spindle assembly rotatable about a longitudinal axis, a guide structure comprising a plurality of guideways, the spindle assembly comprising a spindle and a carriage and the carriage being arranged in parallel relation to the plurality of guideways, a plurality of electrodes being coupled to the carriage via a plurality of flexible links respectively and slidably engaged with the plurality of guideways respectively, each of the plurality of guideways extending radially outward in an extending direction from the longitudinal axis, the method comprising:
   installing the workpiece to a supporting element;
   fixing the guide structure relative to the supporting element;
   moving the rotating spindle assembly to slide each of the plurality of electrodes on a slider along respective one of the plurality of guideways, each slider being coupled to a corresponding flexible link;
   wherein the plurality of electrodes are placed adjacent to an outer face of a workpiece and the machining is from the outer face towards an inner face;
   machining the outer face of the workpiece.

11. The method of claim 10, wherein each of the plurality of guideways extend along a direction perpendicular with respect to the longitudinal axis.

12. The method of claim 10, wherein the guide structure is fixed relative to a supporting element configured to support the workpiece.

13. The method of claim 10, wherein each of the plurality of flexible links and each of the guideways are configured to allow the plurality of electrodes, driven by the rotating spindle assembly, to be fed to the workpiece, respectively along directions perpendicular with respect to a moving direction of the rotating spindle assembly.

14. The method of claim 10, wherein the carriage is assembled with the rotating spindle, and the carriage has an increased horizontal size compared to the rotating spindle, in a plane substantially perpendicular to the longitudinal axis of the rotating spindle.

15. The method of claim 14, wherein the plurality of flexible links are configured to couple the plurality of electrodes to the carriage at a position near an outer boundary of the carriage.

16. The method of claim 10, wherein the workpiece is an annular part with one or more holes extending through a wall of the workpiece.

17. The method claim 10, wherein machining the outer face of the workpiece comprises creating holes through a wall in the workpiece.

18. The method of claim 10, wherein machining the outer face of the workpiece comprises creating recesses in a wall of the workpiece.

* * * * *

UNITED STATES PATENT AND TRADEMARK OFFICE
CERTIFICATE OF CORRECTION

PATENT NO. : 11,717,903 B2
APPLICATION NO. : 17/580819
DATED : August 8, 2023
INVENTOR(S) : Renwei Yuan et al.

It is certified that error appears in the above-identified patent and that said Letters Patent is hereby corrected as shown below:

In the Claims

In Column 9, Claim 17, Line 8, delete "method claim" and insert -- method of claim --, therefor.

Signed and Sealed this
Twenty-fourth Day of October, 2023

Katherine Kelly Vidal
*Director of the United States Patent and Trademark Office*